United States Patent
Stelmack et al.

(10) Patent No.: US 9,491,911 B2
(45) Date of Patent: Nov. 15, 2016

(54) METHOD FOR MODIFYING ENVIRONMENTAL CONDITIONS WITH RING COMPRISED OF MAGNETIC MATERIAL

(71) Applicants: Dennis Jason Stelmack, Fort Saskatchewan (CA); Eugene Gerald Stelmack, Fort Saskatchewan (CA)

(72) Inventors: Dennis Jason Stelmack, Fort Saskatchewan (CA); Eugene Gerald Stelmack, Fort Saskatchewan (CA)

( * ) Notice: Subject to any disclaimer, the term of this patent is extended or adjusted under 35 U.S.C. 154(b) by 94 days.

(21) Appl. No.: 14/184,624

(22) Filed: Feb. 19, 2014

(65) Prior Publication Data
US 2015/0230414 A1     Aug. 20, 2015

(51) Int. Cl.
*A01G 15/00*     (2006.01)
*B64G 1/10*      (2006.01)
*B64G 99/00*     (2009.01)

(52) U.S. Cl.
CPC ............. *A01G 15/00* (2013.01); *B64G 1/1085* (2013.01); *B64G 9/00* (2013.01)

(58) Field of Classification Search
CPC .................................................... A01G 15/00
USPC ............................................................. 239/14.1
See application file for complete search history.

(56) References Cited

U.S. PATENT DOCUMENTS

| 5,295,625 A | 3/1994 | Redford | |
|---|---|---|---|
| 2008/0203329 A1* | 8/2008 | Cody | G02B 5/0242 250/515.1 |
| 2009/0032214 A1 | 2/2009 | Hucko | |
| 2010/0040504 A1 | 2/2010 | Elmaleh | |
| 2010/0251789 A1 | 10/2010 | Baird | |
| 2010/0282860 A1* | 11/2010 | Field | A01G 15/00 239/14.1 |

FOREIGN PATENT DOCUMENTS

| CA | 2310834 A1 | 5/1999 |
|---|---|---|
| CA | 2688856 A1 | 11/2008 |
| WO | 9902337 A1 | 1/1999 |
| WO | 2008104568 A1 | 2/2008 |

OTHER PUBLICATIONS

Gerard O'Neill, Space Resources and Space Settlements, NASA 1977 Summer Study, NASA SP-428.*
Jerome Pearson, John Oldson, and Eugene Levin; Earth Rings for Planetary Environment Control; 53rd International Astronautical Congress, Oct. 10-19, 2002/Houston, Texas, USA; http://www.star-tech-inc.com/papers/earth_rings/earth_rings.pdf.
Antipas T. S. Massawe; Global Warming Control to Mitigate Climate Change; Published Online May 2012 (http://www.SciRP.org/journal/eng).

* cited by examiner

*Primary Examiner* — Arthur O Hall
*Assistant Examiner* — Adam J Rogers

(57) ABSTRACT

A method for modifying environmental conditions is disclosed herein. The method includes the step of deploying a magnetic climate control material to a local area in one of the thermosphere and the exosphere. The magnetic climate control material deflects and absorbs rays of the sun. The magnetic climate control material affects temperature of a local area below the magnetic climate control material and also global temperatures. The method also includes the ability for moving, manipulating, or removal of this ring.

2 Claims, 4 Drawing Sheets

METHOD FOR MODIFYING ENVIRONMENTAL CONDITIONS WITH RING COMPRISED OF MAGNETIC MATERIAL

BACKGROUND OF THE INVENTION

1. Field of the Invention

The invention relates to method for modifying global environmental conditions by deflecting and absorbing solar radiation.

2. Description of Related Prior Art

Jerome Pearson, John Oldson and Eugene Levin of Star Technology and Research, Inc. presented a paper entitled "Earth Rings for Planetary Environment Control" at the 53rd International Astronautical Congress in October, 2002. The paper examines the creation of an artificial planetary ring about the Earth to shade it and reduce global warming. The ring could be composed of passive particles or controlled spacecraft with extended parasols. Using material from dangerous asteroids might also lessen the threat of asteroid impacts. A ring at 1.2-1.6 of Earth's radii would shade mainly the tropics, moderating climate extremes, and could counteract global warming, while making dangerous asteroids useful. It would also reduce the intensity of the radiation belts. A preliminary design of the ring was developed, and a one-dimensional climate model was used to evaluate its performance. Earth, lunar, and asteroidal material sources are compared to determine the costs of the particle ring and the spacecraft ring. Environmental concerns and effects on existing satellites in various Earth orbits are addressed. The particle ring endangers LEO satellites, is limited to cooling only, and lights the night many times as bright as the full moon. The concept was expected to cost an estimated $6-200 trillion. The ring of controlled satellites with reflectors has other attractive uses, and would cost an estimated $125-500 billion.

SUMMARY OF THE INVENTION

In summary, the invention is a method for modifying environmental conditions. The method includes the step of deploying a magnetic climate control material to a local area in one of the thermosphere and the exosphere. The magnetic climate control material deflects and absorbs rays of the sun. The magnetic climate control material affects temperature of a local area below the magnetic climate control material and also global temperatures.

BRIEF DESCRIPTION OF THE DRAWINGS

The detailed description set forth below references the following drawings.

DETAILED DESCRIPTION OF EXEMPLARY EMBODIMENT

Figure 1:
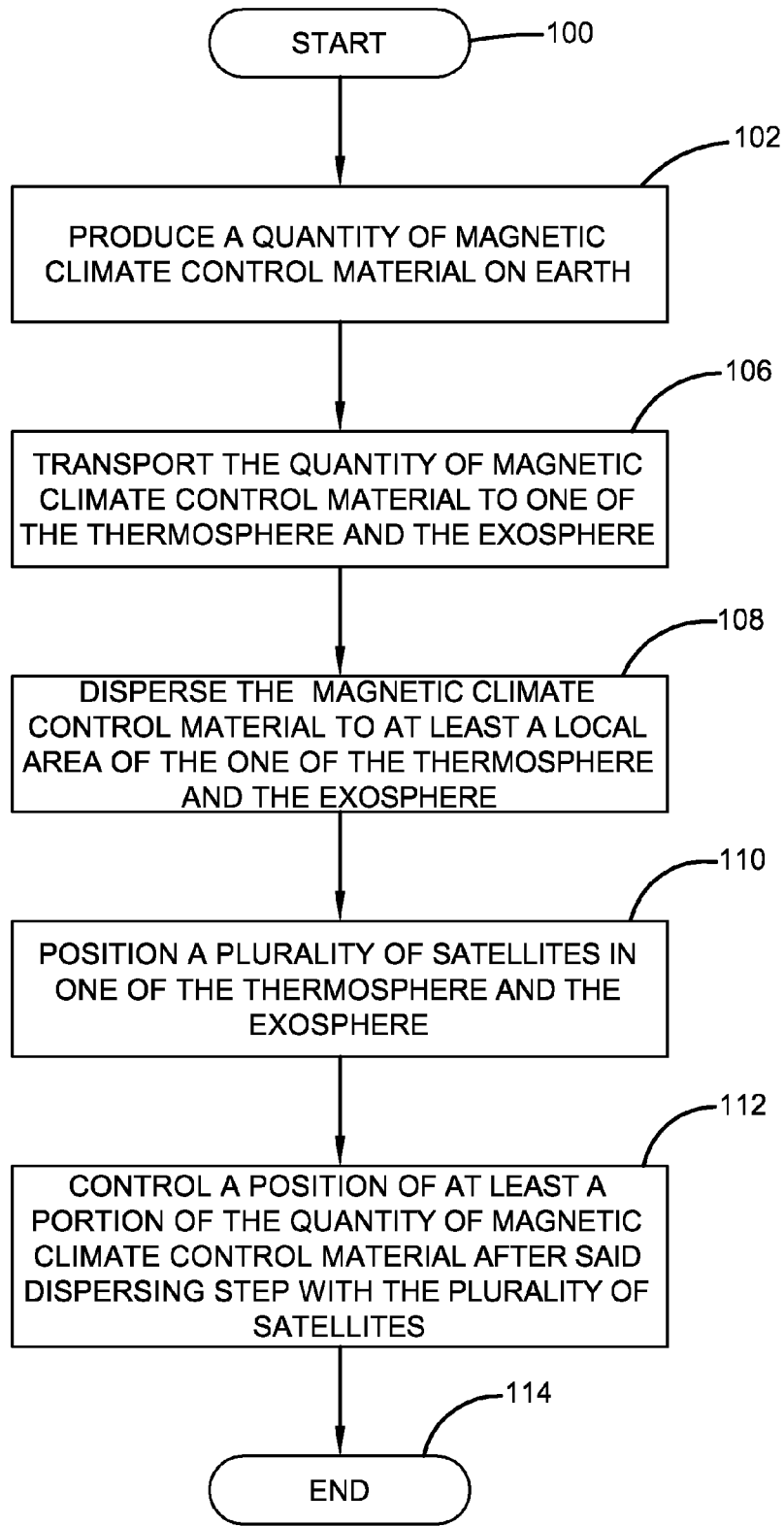
FIG. 1 is a simplified flow diagram of a method according to an exemplary embodiment of the invention.

The inventor has observed that the international scientific community has reached consensus that ongoing climate change has raised the earth's global average temperature, this has had an effect on the earth's ecosystems, and that larger impacts are likely in the future. The recent increase in global temperatures is changing the world's climate in unpredictable and damaging ways. No matter what the cause, whether it is because of natural factors or just simply a man-made consequence of an industrial society, the one degree Fahrenheit observed increase in global temperature has already caused incalculable damages. If current course is not changed, the problems detailed below are likely to arise.

It is likely that the polar ice caps will continue to melt. The melting of the ice caps is a four-pronged danger. First, it will raise sea levels. There are 5,773,000 cubic miles of water in ice caps, glaciers, and permanent snow. According to the National Snow and Ice Data Center, if all glaciers melted today the seas would rise about 230 feet. Second, melting ice caps will throw the global ecosystem out of balance. The ice caps are fresh water, and when they melt they will desalinate the ocean. The desalinization of the Gulf current will negatively impact ocean currents, which regulate temperatures. The stream shutdown or irregularity would cool the area around Northeast America and Western Europe. Third, temperature rises and changing landscapes in the Arctic Circle will endanger several species of animals. Only the most adaptable will survive. Fourth, global warming will increase exponentially as the ice caps melt. Ice caps are white, and reflect sunlight, much of which is reflected back into space, further cooling Earth. If the ice caps melt, the only reflector is the ocean. Darker colors absorb sunlight, further warming the Earth.

Climate change will increase the probability and intensity of droughts and heat waves. Although some areas of Earth will become wetter due to global warming, other areas will suffer serious droughts and heat waves. A perfect example of this problem occurred in the United States of America in 2012. Africa will be affected most negatively, but more severe droughts are also expected in Europe. Water is already a dangerously rare commodity in Africa, and according to the Intergovernmental Panel on Climate Change, global warming will exacerbate the conditions and could lead to conflicts and war.

Climate change will exacerbate the spread of many diseases. Increasing temperature promotes the spread of many diseased. As the planet warms, disease carrying insects migrate north, bringing disease with them. Climate greatly influences some of the most deadly and widespread diseases currently affecting millions of people across the world. With disease-bearing insects such as mosquitoes able to multiply in staggering numbers thanks to even small rises in temperature, global warming looks set to facilitate the spread of diseases like Malaria, West Nile virus and Dengue fever to parts of the planet usually untouched. The increased number of sick people could even overwhelm public health services—especially in poor or unprepared countries. The diseases that have been identified as those most likely to spread due to global warming include Avian Flu, Cholera, Plague, Ebola and Tuberculosis.

Climate change will increase the frequency and severity of floods. Flooding represents one of the most dangerous hazards to human settlements and is one of the most potentially momentous impacts of global warming. As the climate changes, a warming of the seas creates "thermal expansion." Thermal expansion is the phenomena of warm water taking up more space than cool water, making the sea's surface level increase. Thermal expansion has already raised the height of the oceans by 4 to 8 inches (10 to 20 cm), according to National Geographic. Steadily melting glacial ice will also add significantly to the elevation in water surface level, and many low-lying or coastal communities and facilities will be under the threat of eradication should the sea levels continue to rise. An increase of just a single meter (3 ft) would submerge considerable sections of the U.S. eastern seaboard, while one sixth of Bangladesh could be lost permanently by a rise of 1.5 m (5 ft), to name just two examples. The relocation of power stations, refineries, hospitals, homes and so on would become an expensive priority. Also, warmer air can hold more water vapor, increasing the level of rainfall and bringing flooding to inland areas.

Fires and wildfires might increase because of climate change. As the planet continues to warm, dry areas of land that are already susceptible to wildfires are likely to be ravaged by even more frequent and destructive episodes. What's more, the carbon dioxide and 'black carbon' (a very fine soot) released by these large-scale fires together combined with deforestation compounds to the problem of air pollution.

More dangerous thunderstorms will occur because of climate change. A consequence of the increased amounts of humid air generated by global warming is that more thunderstorms will be triggered. Research into the dynamic between climate change and thunderstorm power and frequency suggests that by the end of the century the occurrence of major thunderstorms could rise by over 100% in some places. Not only that, but this increase would generally occur during the existing storm season and not at times when such storms might provide beneficial rainfall to arid areas. Thunderstorms are also a common way of starting the devastating wildfires mentioned above.

It is also likely that storms will be more intense and destructive. With ocean temperature being a key factor for hurricane formation, the consequences of global warming will inevitably include the increased generation of storms and hurricanes with greater power and frequency. The destructive power of hurricanes has increased by some 50% in the last 30 years, a figure that is closely connected with the rising temperature of the ocean. Warmer water leads to greater evaporation, which in turn helps prime the formation of hurricanes and cyclones and also maintains their power once formed. Simply put, warmer oceans make for more extreme weather including devastating storms.

The frequency of cold waves will increase because of climate change. A cold wave is characterized by a major plunge in temperature over a 24 hour period. It can be a devastating shock for crops and commerce, and also bring death and injury to humans and animals through accidents, hypothermia and starvation. Damage to pipelines and property can be costly, and, particularly if snowfall accompanies the cold wave, transport systems can grind to a halt, adversely affecting the distribution of food, water and medical supplies. It may seem illogical at first to attribute harsher cold weather to global warming, but a change in atmospheric patterns brought about by receding glacial ice can lead to the redirection of polar air currents and the sun's rays being absorbed by the larger areas of dark blue sea, while critical phenomena like the Gulf Stream can be affected by changing ocean temperatures as well.

It is likely that the frequency of tsunamis will increase because of climate change. Although global warming does not directly influence the formation of tsunamis, they can be generated by events that are brought about by an amplification of the planet's temperature. One example is the melting of ice sheets. Being extremely heavy, massive glaciers apply a considerable amount of pressure to the Earth's surface underneath them. This anchorage decreases as the glaciers diminish, resulting in a 'freeing up' of tectonic masses that can lead to massive earthquakes and significant volcanic activity, both of which are capable of creating deadly tsunamis.

Increased volcanic activity can be attributed to climate change. As already noted, melting glaciations can usher in new, more frequent and more dangerous episodes of volcanic activity. The shifting pressures brought about by the lightening of the vast ice sheets allows the Earth's crust to "bounce back" and can cause eruptions in unexpected places—like the one experienced during Iceland's Gjálp eruption, where magma reached the surface at an unusual intermediary point between two volcanoes. Potent or sustained volcanic activity can have an immense impact on human life even if the activity is centered away from dense population centers. It also has the potential to affect the planet's climate by injecting tons of gases and solids into the atmosphere that can remain there for weeks.

Climate change will result in the loss of biodiversity and cause animal extinction. Loss of habitat for polar-ice edge communities such as polar bears is perhaps the most obvious consequence of having a warmer climate. Animals that are entirely dependent on cold environments will retreat to more northerly locations as the planet heats up—leading to encroachment upon other eco-systems and displacement of other animals from their natural habitat. A strong connection between oceanic warming, declines in reproduction and increases in mortality rates among seabirds, seals and sea lions has already been observed.

Climate change will strain ocean life. The world's oceans absorb roughly 30% of all carbon dioxide that seeps into the atmosphere, and so inevitably, as more fossil fuels are burned, ocean life will continue to suffer the negative consequences of global warming. One of the most critical changes brought about by global warming is the ongoing reduction of phytoplankton. These tiny plants are an integral food source for ocean life and are responsible for around half of the world's photosynthetic activity. Essentially, they are the foundations of the oceanic food chain, so a reduction in their numbers creates a knock-on effect that ripples up the entire food chain, particularly affecting the predators at the top. Additionally, ocean acidification and warmer surface temperatures increase the dangers to many aquatic animals, particularly crustaceans, mollusks and coral reefs. Coral reefs are very sensitive to temperature changes, with many of them already observed to have 'bleached' and died thanks to climate change.

Animal attacks will increase because of global warming. Animals that are driven from their natural habitats or normal migration routes by environmental factors could easily come into contact with human settlements, leading to many deaths among humans and already endangered animals. During the serious, recent droughts that struck Kenya's Amboseli National Park, lions began to venture out of the park in search of prey, resulting in attacks on the already decimated Maasai livestock and even trapping some people in their homes. Attacks on humans by tigers in India are on the rise as climate change affects mangrove forests in India's Sundarban region. Similarly, sharks are moving into new areas to find stable food sources, and some of these are heavily populated by humans. Experts say there are now more sharks in the waters off California and Florida than ever before.

Food and water supplies will diminish because of climate change. With greatly reduced rainfall, more severe droughts and loss of soil fertility, food and water supplies would soon diminish, resulting in higher prices, famine, disease, malnutrition, starvation and, ultimately, death. Politically unstable countries or badly affected areas might descend into various degrees of anarchy, with governmental collapses and shifts in authority as those in control of resources become more powerful. Countries that still retain good food and water resources might be unwilling to part with these vital commodities or accept the millions of refugees that would seek new homes.

The economic consequences of climate change will be severe. As set forth above, the effects of global warming will be severe. All of the effects noted above implicate economic consequences. Hurricanes, for example, cause billions of dollars in damage, diseases cost money to treat and control and conflicts exacerbate all of these.

For the purposes of this disclosure, the following definitions are provided:

Global Warming: A general warming trend of the Earth's environment, and in current use specifically refers to the increase in the average global temperature of the Earth's near-surface air and oceans since the mid-20th century due to climate forcing by greenhouse gasses, and its includes both a projected continuation into the future without action to control it, as well as a perception of severe consequences for life and civilization on Earth if unchecked.

Global Cooling: As used herein, an active method for reducing the energy incident on the Earth, its land, its oceans, or its atmosphere, with a resultant decrease in the average global temperature (or at least a decrease in the rate of the rise in global temperatures). Historically, global cooling refers to a natural general cooling trend of the Earth, and this context is not intended for the purposes of this invention. Rather, here, global cooling is an active effort to reduce global temperatures through methods, systems, devices, and agents.

Geoengineering. An engineering process by which a planet's climate is modified by methods, systems, devices, or agents. Geoengineering is usually taken to mean device, systems, or agent-based engineering approaches, to deliberately manipulate the Earth's climate to counteract global warming through changes in the solar radiation incident upon the Earth. Geoengineering can also mean to force global cooling.

Nanomaterial. Materials manufactured or created to have at least one dimension (width, length, diameter, or structured feature) less than 100 micron in size. A powder with particle size under 100 nm is called a nanopowder.

The invention, as demonstrated by the exemplary embodiment described below, can provide a method for controlling climate change. In such a method, fine magnetic particles can be injected or dispersed into the thermosphere or exosphere. The magnetic dust particles would block, reflect and absorb some of the incoming solar radiation and remove some of the harmful UV light which can be harmful to humans, plants and animals alike. In such a method, the world's global temperatures would be lowered and we wouldn't see our sea levels rise.

This invention is directed to systems, materials, and methods of environmental modification with magnetic climate control materials. The invention may include materials which may cause a localized change in albedo and temperatures which in turn affect the planetary albedo and the global temperatures. In addition, the invention may be reversible and may include different materials, designs, deployments, and sensing apparatus and techniques.

An embodiment of the broader invention can include a magnetic dust ring for earth climate control. A magnetic powder put in a ring around Earth's equator relatively far out in space. The ring can act as a screen in space which is not bound together, in order to block and absorb some of the sun's solar rays allowing the Earth to cool. The installation of the ring can be reversible because of the magnetic properties of the particles.

According to an aspect of one or more embodiments of the invention, a method is provided for geo-engineering and more specifically to a method for mitigating, controlling or modifying climate change through injection or deployment of an ultra-fine magnetic material or dust in the thermosphere or exosphere. The particles are dispersed or injected in a concentration which will lower not only the local area temperatures but also the global temperatures as to off-set the current and expected increasing temperatures of the world. These nanoparticles can be monitored and also collected and re-positioned if desired.

Embodiments of the invention may affect the absorption and/or reflection of incident solar energy (albedo), and the albedo of local areas may be adjusted in order to slow down the melting rate, enhance retention, and/or increase the formation of ice and/or snow which would in turn affect the Earth's global temperatures as a whole.

An embodiment of the present disclosure could implement global cooling through the release of reflective, absorptive ultra-fine magnetic material or dust (nanopowders) into the thermosphere or exosphere. The release of these nanopowders could be but not limited to the use of rockets injecting the material into the thermosphere or exosphere. The material will be processed here on Earth to insure proper particle size and magnetic qualities. Reasoning behind insuring particle size is because it is understood that particles with a larger size and mass pose a greater risk to future space travel and to satellites orbiting Earth due to the abrasive qualities of large sized particles. In one or more embodiments, the particle size could be 0.1-100 microns. Material could be nickel.

It has been estimated that in order to offset the effects of global warming caused by a doubling of $CO_2$ concentration (compared to pre-industrial levels and corresponding to an increase in global temperature of approximately 2° C.) solar insolation must be reduced by 1.7% The embodiment described herein would deflect or absorb 1.7% of the sun's rays.

Dust clouds were believed not to be controllable and could only be placed with suitable initial conditions, with subsequent replenishment necessary due to the orbital decay or perturbation of the particle orbits. With the additional magnetic qualities of the material mentioned in this disclosure, a dust cloud or ring will be able to be controllable via satellites equipped with electromagnets. These satellites would be capable to collect and re-disperse the magnetic material as desired. Reasons for collection would be to reposition a portion of the cloud or ring if material was drifting closer to existing satellites which are in asynchronous orbit.

A method according to one embodiment of the broader disclosure is disclosed in FIG. 1. The method starts at 100. At step 102, a quantity of magnetic climate control material is produced on Earth. Nickel can be used as the magnetic climate control material. Nickel is not toxic to humans and animals. Under the unlikely scenario that the material forming the ring returns to Earth, nickel will not poison the environment.

The quantity of magnetic climate control material is produced as ultra-fine particles. The production of the magnetic climate control material on Earth will reduce the cost of forming the magnetic ring, as compared to mining on the Moon or utilizing an asteroid. The particle size can be selected to maximize location stability and/or deflection capacity.

At step 106, the quantity of magnetic climate control material transported to one of the thermosphere and the exosphere. The precise distance selected for the magnetic ring can be chosen to minimize the likelihood that the magnetic climate control material will contact or interact with space craft and satellites. For example, the radius of the magnetic ring can be greater than the orbit of most commercial satellites.

At step 108, the magnetic climate control material can be dispersed to at least a local area of the one of the thermosphere and the exosphere. In some embodiments, a partial ring can be formed. In other embodiments, the quantity of magnetic climate control material can be arranged in a full ring around the Earth. The magnetic climate control material deflects and absorbs the rays of the sun and thereby affects temperature of a local area below the magnetic climate control material and also the Earth's global temperature as a whole.

Figure 2:
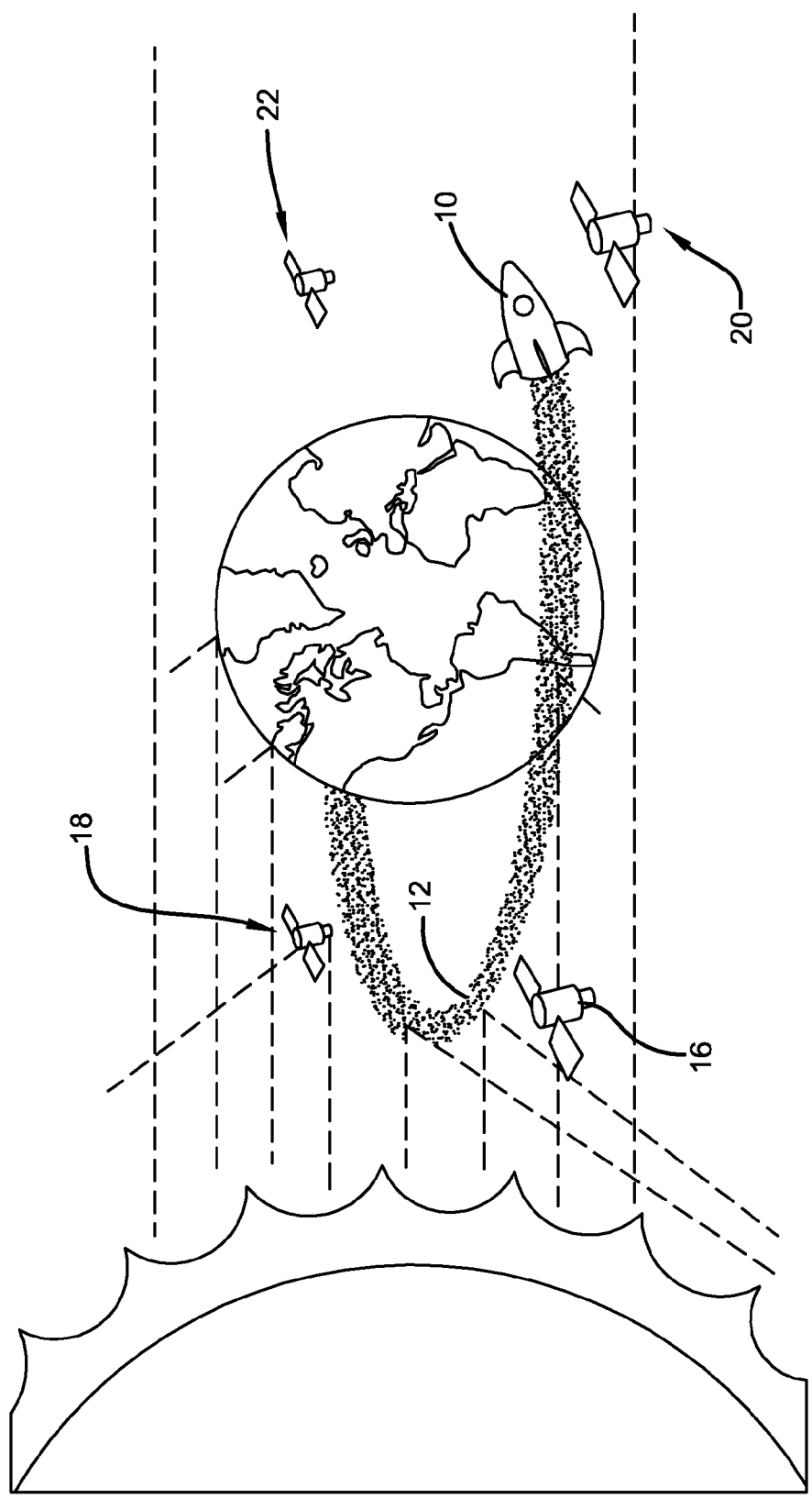
FIG. 2 is an illustration of the installation of a magnetic ring according to an embodiment of the invention.
Figure 3:
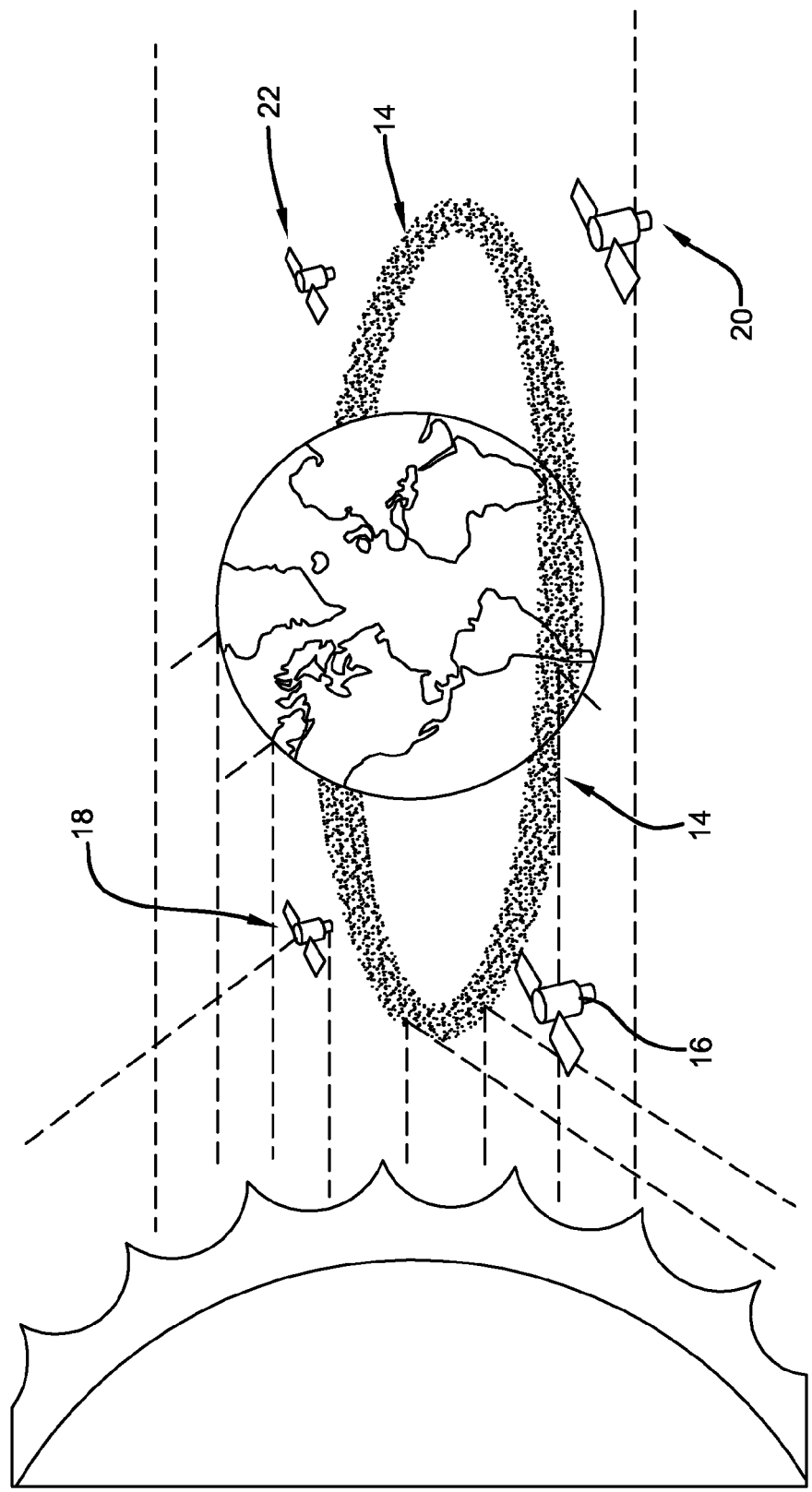
FIG. 3 is an illustration of magnetic ring installed and in operation.

FIG. 2 shows a spacecraft 10 dispersing magnetic climate control material 12 around the Earth. The magnetic climate control material 12 has been processed into an ultra-fine powder, comprised of magnetic particles. The spacecraft 10 can encircle the Earth while releasing the magnetic climate control material and ultimately forming a ring 14 as shown in FIG. 3.

Figure 4:
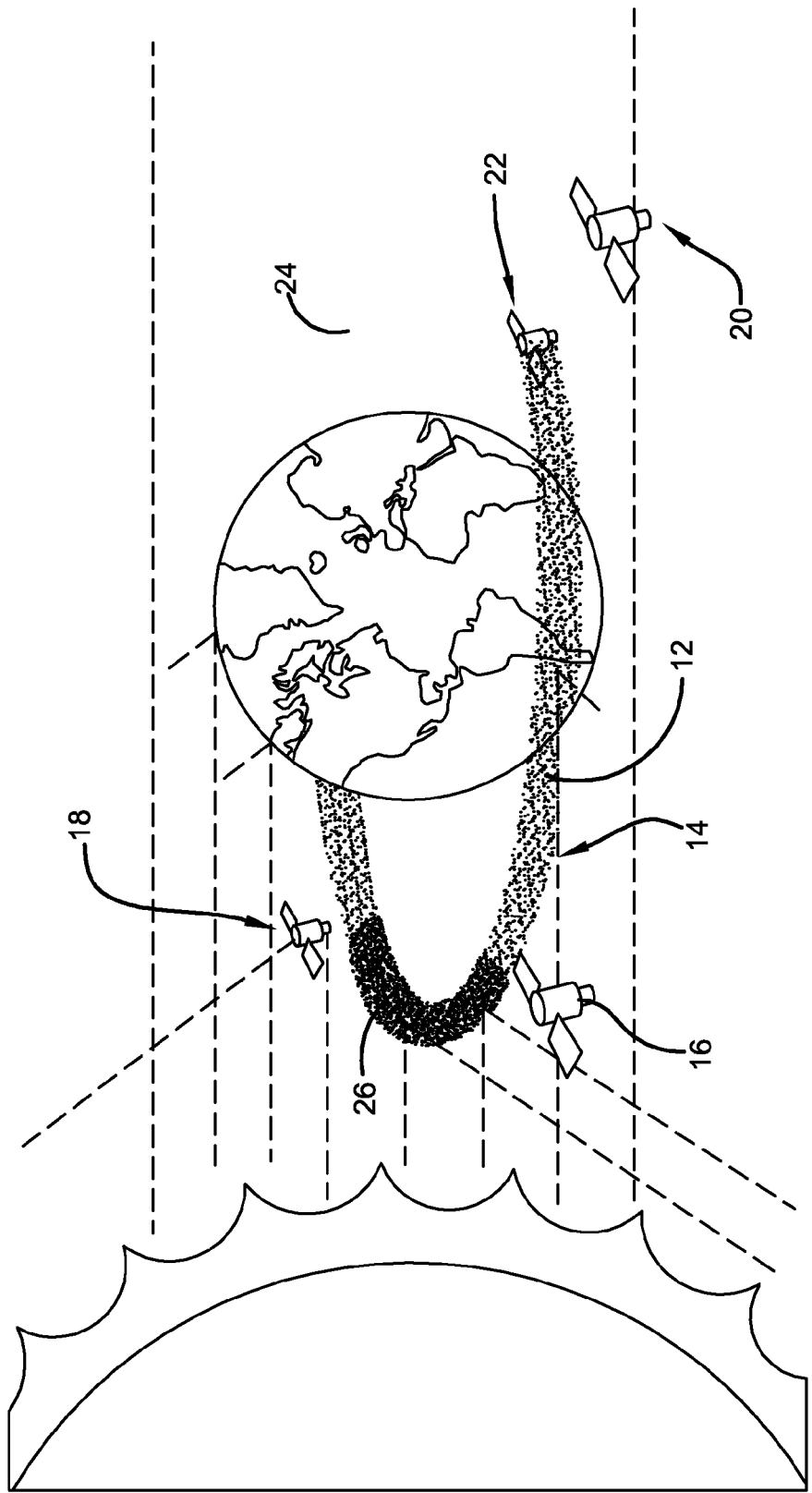
FIG. 4 is an illustration of modification of the magnetic ring.

Referring again to FIG. 1, a plurality of satellites are positioned in one of the thermosphere and the exosphere at step 110. FIGS. 2-4 show satellites 16, 18, 20, 22. Each of the satellites 16, 18, 20, 22 can include communications equipment to receive commands from Earth. Each of the satellites 16, 18, 20, 22 can also include processing units and actuators to process and implement commands received from Earth. Each of the satellites 16, 18, 20, 22 can also include propulsion and navigation equipment to maintain and move from a geosynchronous orbit.

Referring again to FIG. 1, a position of at least a portion of the quantity of magnetic climate control material can be controlled after dispersion with the plurality of satellites at step 112. The position of at least a portion of the quantity of magnetic climate control material can be controlled by moving some of the material from one area of the ring to another area, by withdrawing some of the material from the ring for some period of time, and/or by removing all of the material from the ring. The exemplary process ends at step 114.

Each of the satellites 16, 18, 20, 22 can include one or more
electromagnets. The satellites will be controlled from Earth or possibly the international space station. Once flying through a portion of the ring the electromagnets can be powered to create a magnetic field to collect a portion of the ring. The collected ultra-fine particles can then be moved with the satellite with the electromagnet that is powered away for the first portion of the ring to a second portion of the ring.

FIG. 4 shows an example of the repositioning of at least a portion of the quantity of magnetic climate control material being controlled after dispersion with one of the plurality of satellites. Satellite 22 has powered its electromagnet and collected (or captured) a portion of material 12 of the ring 14. The collected or missing portion is referenced at 24. The satellite 22 has travelled to a second portion of the ring 14 and released the collected quantity of magnetic climate control material. In this example, the satellite 22 has reallocated the quantity of magnetic climate control material to a portion of the ring 14 referenced at 26. The portion 26 of the ring 14 has a relatively higher concentration of magnetic climate control material and can deflect or absorb the sun's radiation at a higher level than before the reallocation. The satellite 22 is shown returning to its original position after the operation.

Embodiments of this disclosure can be practiced in which the ring 14 of magnetic climate control material is removed entirely. The electromagnets of the satellites 16, 18, 20, 22 can be powered and the satellites 16, 18, 20, 22 can be moved about the ring 14 to harvest the magnetic climate control material as fully as possible. The collected material can be transferred to a spacecraft and returned to Earth, or flown back into our atmosphere with the intent of burning material and satellite, or to fly to an outer orbit to wait for another point of time in which the material will be needed again.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A method for modifying environmental conditions consisting of the steps of:
producing a quantity of magnetic climate control material as ultra-fine particles on Earth;
transporting the quantity of magnetic climate control material to one of the thermosphere and the exosphere;
dispersing the magnetic climate control material to at least a local area of the one of the thermosphere and the exosphere, wherein the magnetic climate control material deflects and absorbs the rays of the sun and thereby affects temperature of a local area below the magnetic climate control material and also the global temperatures;
selecting only nickel particles as the material of the magnetic climate control material;
wherein said dispersing includes arranging the quantity of magnetic climate control material in a ring being only nickel particles around the Earth;
positioning a plurality of satellites in one of the thermosphere and the exosphere; and
controlling a position of at least a portion of the quantity of magnetic climate control material after said dispersing step with the plurality of satellites by:
creating a magnetic field in a first portion of the ring with an electromagnet
mounted on one of the plurality of satellites, inducing polarization of the ultra-fine particles of the at least a portion of the
quantity of magnetic climate control material in the first portion of the ring with the electromagnet, collecting the polarized the ultra-fine particles with the electromagnet from the first portion after said dispersing, moving the collected, polarized ultra-fine particles with the one of the plurality of satellites away for the first portion of the ring to a second portion of the ring, and releasing the collected, polarized ultra-fine particles to the second portion of the ring, thereby increasing a concentration of ultra-fine particles of the quantity of magnetic climate control material in the second portion.

2. The method of claim 1 further comprising the steps of:

capturing, after said controlling, a majority of the quantity of magnetic climate control material with the electromagnet; and returning the quantity of captured magnetic climate control material to Earth after said capturing step.

\* \* \* \* \*